July 2, 1929. H. W. HYDE 1,719,767

SPRING SUSPENSION FOR VEHICLES

Original Filed May 4, 1925

INVENTOR=
Harry Webb Hyde,
by Machod, Calver, Copeland & Dike,
ATTORNEYS.

Patented July 2, 1929.

1,719,767

UNITED STATES PATENT OFFICE.

HENRY WEBB HYDE, OF NORTH COHASSET, MASSACHUSETTS, ASSIGNOR TO HYDE ENGINEERING COMPANY, OF BOSTON, MASSACHUSETTS, A CORPORATION OF MASSACHUSETTS.

SPRING SUSPENSION FOR VEHICLES.

Application filed May 4, 1925, Serial No. 27,688. Renewed May 23, 1929.

This invention relates to vehicle spring suspensions of the general type shown and described in my prior Letters Patent No. 1,524,437, dated January 27, 1925.

As explained in said prior Letters Patent, the invention therein shown consists primarily in providing a vehicle with longitudinal reaches connected at their ends either directly or indirectly with the axles and in supporting the body on the reaches intermediate the ends of the latter in such a manner as to permit said body to rock freely with respect to and independently of the reaches upon a horizontal transverse axis, so that tilting or rocking of the reaches, caused by a vertical movement of one of the axles, will not be transmitted to the body and will not tend to tip or pitch the same, the reaches merely rocking about the pivotal axis, and the body maintaining its substantially horizontal position, its only movement being a slight vertical one in a substantially rectilinear direction.

In subsequent Letters Patent Nos. 1,667,115 and 1,667,116, dated April 24, 1928, and No. 1,677,675, dated July 17, 1928 are shown various developments of the broad invention disclosed and claimed in Letters Patent No. 1,524,437 aforesaid, and modifications of the forms illustrated in the latter, whereby the advantages of the original invention are secured to an increased degree and certain additional advantages obtained. The present invention has for its object to provide a simple and inexpensive construction combining several of the features, and securing substantially all of the advantages of the several constructions covered by the applications referred to.

The foregoing and other objects of the invention, together with means whereby the latter may be carried into effect, will best be understood from the following description of certain forms or embodiments thereof illustrated in the accompanying drawings. It will be understood, however, that the particular constructions described and shown have been chosen for illustrative purposes merely, and that the invention, as defined by the claims hereunto appended, may be otherwise embodied without departure from its spirit and scope.

In said drawings:

Fig. 1 is a side elevation and

Fig. 2 a plan view of a spring suspension embodying the invention.

The principle of operation of a spring suspension of the general type of that to which the present invention relates is fully explained in my prior Letters Patent above referred to. For the purposes of the present description, this principle may be briefly outlined as follows:

In the ordinary vehicle, whether provided with elliptical, semi-elliptical or cantilever springs, the springs are in effect rigidly secured to the body or frame, and any shock or blow on a wheel, due to unevenness in the road, which causes the wheel to rise or fall suddenly, is communicated directly to the body at a point substantially over the axle, and since this point is at an extreme distance from the centre of gravity of the body, the shock has a maximum tendency to cause pitching of the latter.

In the type of spring suspension to which the present invention relates, on the contrary, if the front wheel, for example, be raised, owing to an unevenness in the road, the tendency is for the spring reach to turn about the pivotal axis through which it is connected with the body, but not to rock the body. It thus tends to swing the rear end of the reach and the rear axle downward about the pivot, so that a part of the blow is absorbed by the pneumatic tire on the rear wheel. Likewise, when the rear wheel goes over an obstruction or drops into a hole, the front wheel receives the major part of the reaction, and the body is affected relatively little. In any event, any lifting force, or the resultant of such lifting forces as may be transmitted to the body as a result of the rocking of the reaches, is applied to the body near the centre of gravity thereof, so that there is small gyratory moment acting upon the body eccentric at its centre of gravity. The effect is merely to lift the pivot and consequently the body vertically to a slight extent and not to rock or pitch the body.

Figure 1:
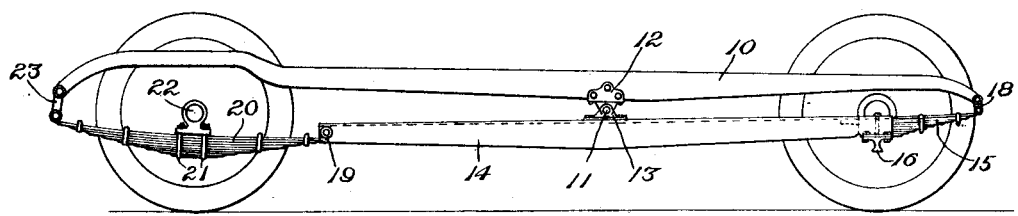
Figure 2:
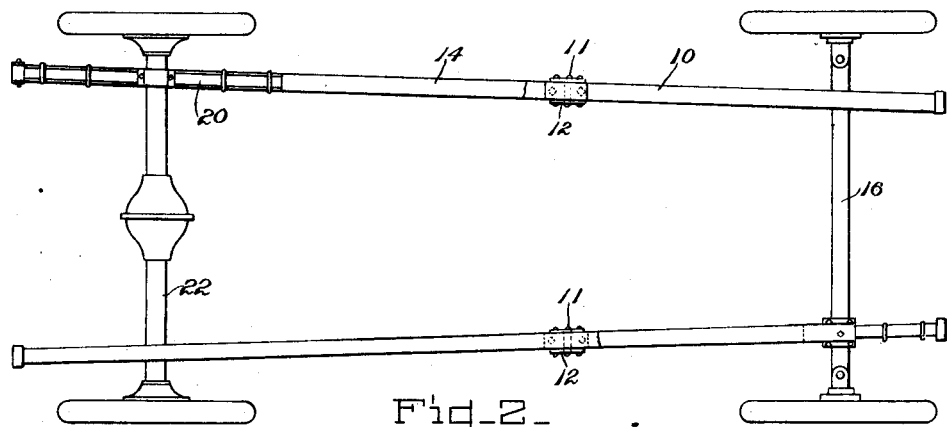

Referring now to Figs. 1 and 2, there is shown therein a pair of reaches to which the body-supporting chassis frame 10, hereafter referred to as the body frame, is connected by means of co-axial pivots 11 interposed between brackets 12 and 13 on the body frame and reaches respectively, the axis of said pivots being preferably located slightly in front of the centre of gravity of the body. Each of said reaches preferably comprises a substantially rigid beam 14 one end of which, as in application Serial No. 641,932, above referred to, is directly connected to one of the axles, herein the front axle 16. Beyond the axle 16 the beam 14 is provided with a leaf spring extension 15, the end of which is connected with the front end of the body frame 10 by a shackle 18. Each spring extension 15 is preferably composed of a considerable number of relatively thin, light leaves, thereby permitting said springs to act not only as balancing or stabilizing springs, but as shock absorbers or oscillation dampers, as more fully explained in application Serial No. 641,934, above referred to. The rear ends of the beams 14 are pivotally connected, as at 19, to the forward ends of semi-elliptic springs 20 supported intermediate their ends by hangers 21 from the rear axle 22. At their rear or outer ends the springs 20 are connected by shackles 23 with the rear end of the body frame 10.

In operation, upward movement of the rear axle 22 causes opposed upward forces to be applied to the body at opposite sides of the centre of gravity thereof through the shackles 23 and pivots 11, said forces balancing one another and preventing rocking of the body when the reaches are rocked by such movement of said axle, as more fully explained in my prior Letters Patent above referred to. When the reaches are rocked in the opposite direction by an upward movement of the front axle 16, the rear ends of the reaches will be forced downwardly, carrying with them the forward ends of the springs 20 with which they are connected. Said springs 20 are in effect fulcrumed upon the rear axle 22, thereby causing downward forces applied to their forward ends by the rear ends of the reaches to result in the application of an upward force to the rear end of the body frame by the rear ends of said springs, so that balanced upward forces are also applied to the body frame at opposite sides of the centre of gravity of the body when the front axle is raised, as more fully explained in application Serial No. 641,933 above referred to. The spring extensions 15 act as balancing or stabilizing springs upon the front end of the body frame and, of course, exert a slight upward thrust upon the body frame when the front axle is raised. These springs are, however, relatively light, being designed to take only their share of the normal weight of the body, so that the upward thrust exerted thereby is negligible. Moreover, the strength of the several springs and the positions of the pivots 11 and shackles 18 and 23 with reference to the centre of gravity of the body may be so proportioned that the upward forces applied to the body are balanced about the centre of gravity of the latter, producing no resultant gyratory moment.

Figure 3:
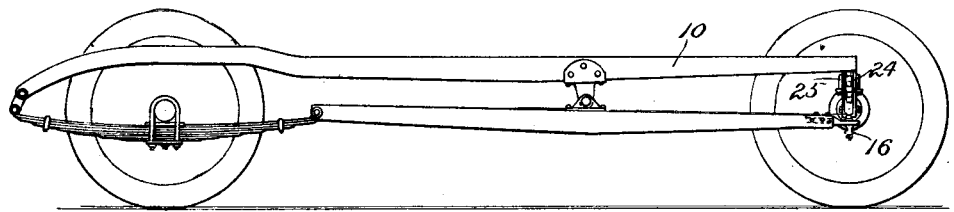
Fig. 3 is a view similar to Fig. 1 illustrating a modification.
Figure 4:
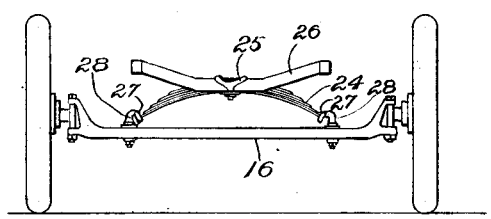
Fig. 4 is a front elevation of the construction shown in Fig. 3.

The construction shown in Figs. 3 and 4 is substantially like that shown in Figs. 1 and 2 except at the forward end. In this construction, the spring extensions 15 are omitted, and the front end of the body frame 10 is supported by a transversely disposed semielliptic spring 24 secured intermediate its ends by a clip 25 to a cross member 26 of the body frame and connected at its ends by shackles 27 with perches 28 herein shown as carried by the front axle 16, although if desired they may be carried by the beams 14 at the rear of the axle. The operation of this form of invention will be obvious from the preceding description without further explanation.

It will be noted that in both forms of the invention shown the rigid portions 14 of the reaches are connected with the front axle directly and not through the medium of interposed spring members. The front axle is therefore firmly held against rocking about a transverse axis and the steering of the vehicle thereby greatly improved.

The words "rear", "front", and similar expressions are herein used as convenient illustrative terms, it being obvious that, although the construction shown is preferred for most purposes, the suspension might be oppositely disposed, the pivotal connection between the body and the reaches being in the rear instead of in front of the center of gravity of the body, and the other parts being correspondingly arranged. These and other modifications of the construction shown will, however, be readily apparent to those skilled in the art without further description in detail.

Having thus described my invention, I claim:

1. In a vehicle having a body frame and front and rear axles, a spring suspension including a pair of reaches, a connection between the reaches and body frame about which the latter is free to rock with respect to the former, each of said reaches including a rigid beam having one end extended to one of the axles and secured thereto, a spring for supporting the adjacent end of the body frame in a normally predetermined position with respect to said beam, and spring means connecting the other axle with the opposite end of said beam and with the opposite end of the body frame.

2. In a vehicle having a body frame and front and rear axles, a spring suspension including a pair of reaches, a connection between the reaches and body frame about which the latter is free to rock with respect to the former, each of said reaches including a rigid beam rigidly connected at one end to one of the axles and having a spring for supporting the adjacent end of the body frame, and a spring fulcrumed intermediate its ends upon the other axle and connected at its opposite ends with said beam and body frame respectively.

3. In a vehicle having a body frame and axles, a spring suspension including a pair of reaches, a connection between the reaches and body frame about which the latter is free to rock with respect to the former, each of said reaches including a rigid beam rigidly connected at one end to one of the axles, and having a leaf spring extension beyond said axle connected with the body frame, and spring means connecting the other axle with the opposite end of said beam and with the body frame.

4. In a vehicle having a body frame and axles, a spring suspension including a pair of reaches, a connection between the reaches and body frame about which the latter is free to rock with respect to the former, each of said reaches including a rigid beam rigidly connected at one end to one of the axles, and having a leaf spring extension beyond said axle connected with the body frame, and a spring fulcrumed intermediate its ends upon the other axle and connected at its opposite ends with said beam and body frame respectively.

5. In a four-wheel vehicle having a body frame and front and rear axles, a spring suspension including at each side of the frame a rigid beam having a pivotal connection with the frame at one side of the centre of gravity thereof and having one end extended to an axle and secured thereto, a spring for supporting the adjacent end of the body in a normally predetermined position with respect to said beam, and a spring connecting the opposite end of the beam with the other axle and the body frame.

6. In a four-wheel vehicle having a body frame and front and rear axles, a spring suspension including a rigid beam having a pivotal connection with the frame about which the latter is capable of rocking with respect to the former, a spring for connecting the rear end of said beam with the rear axle and with the rear end of the body frame, the front end of said beam being extended to the front axle and secured thereto and a spring for supporting the front end of the frame with respect to said beam.

7. In a four-wheel vehicle having a body frame and front and rear axles, a spring suspension including at each side of the frame a rigid beam having a pivotal connection with the frame and having one end extended to one of said axles and secured thereto, a spring for supporting the adjacent end of the body directly from said last named axle, and a spring connecting the opposite end of the beam with the other axle and with the body frame.

In testimony whereof I affix my signature.

HENRY WEBB HYDE.